TELESCOPING SAMPLE PROBE

Filed May 5, 1970 2 Sheets-Sheet 1

INVENTOR.

Frederick G. Weeks

BY

Donnelly, Mentag & Harrington

ATTORNEYS

TELESCOPING SAMPLE PROBE

Filed May 5, 1970 2 Sheets-Sheet 2

INVENTOR.
Frederick G. Weeks
BY
Donnelly, Mentag & Harrington
ATTORNEYS

United States Patent Office 3,610,048

Patented Oct. 5, 1971

3,610,048

TELESCOPING SAMPLE PROBE

Frederick G. Weeks, Richmond, Mich., assignor to Heath Consultants Incorporated, Wellesley Hills, Mass.

Filed May 5, 1970, Ser. No. 34,697
Int. Cl. G01n *1/22*
U.S. Cl. 73—421.5 R 14 Claims

ABSTRACT OF THE DISCLOSURE

A telescoping gas sample probe including, an elongated rigid tube having a sealing means in the form of a conically shaped rubber bellows attached to the lower end of the elongated tube, said bellows having an open lower end, means for centering the bellows on the elongated tube, a flexible tube having one end connected to the upper end of the elongated tube and the other end thereof provided with a fitting for connecting the flexible tube to a gas analyzing and indicating apparatus, a filter means disposed in said elongated tube for filtering an air sample drawn through the elongated tube from a test hole or from the atmosphere directly above a venting surface and, a tubular handle slidably mounted on said elongated tube.

SUMMARY OF THE INVENTION

This invention relates generally to the art of locating gas leaks in underground gas transmission lines, and more particularly, to an improved telescoping gas sample probe for drawing test samples of air from the atmosphere directly above a venting surface or from test holes drilled into the ground over a gas transmission line.

Gas sample probes have been provided heretofore for withdrawing samples of air from holes bored in the ground over gas transmission lines. However, the prior art gas sample probes have certain disadvantages, as for example, they are usually heavy and long which makes them tiresome to carry and troublesome to store. Furthermore, the prior art sample probes are constructed in such a manner that they do not provide an efficient seal relative to the ground in which a test hole is drilled, whereby the time required to probe each test hole is extended because of such an inefficient seal. Nor do the prior art sample probes include a means to shield the intake port from dilution caused by wind shear or side draft in cases where a supersensitive instrument is used for sampling in the atmosphere above a possible venting surface without the air of drilled test holes. In view of the foregoing, it is an important object of the present invention to provide a novel and improved telescopic gas sample probe which overcomes the aforementioned disadvantages of the prior art gas sample probes.

It is another object of the present invention to provide a novel and improved telescoping gas sample probe which is light in weight and compact in construction, economical to manufacture, efficient in operation, and constructed to be reduced in overall length for storage and carrying purposes.

It is still another object of the present invention to provide a novel and improved telescoping gas sample probe which is provided with a sealing means in the form of a conically shaped rubber bellows which is open at the lower end thereof for sealing engagement with the surface of the ground around a possible venting surface or a test hole drilled in the ground, to provide an efficient sealing contact with the ground and to protect the intake port from the diluting effects of wind and side draft.

It is still another object of the present invention to provide a novel and improved telescoping gas sample probe for drawing a test sample of air from a possible venting surface or a test hole in the ground including, an elongated tube, a sealing means attached to one end of said elongated tube for sealing a possible test surface or a test hole from the atmosphere when the probe is moved into position over said test surface or test hole, and, a flexible tube having one end connected to the other end of said elongated tube, and the other end thereof provided with a fitting for connecting the flexible tube to a gas analyzing and indicating apparatus.

It is still another object of the present invention to provide a novel and improved telescoping gas sample probe for drawing a test sample of air from a possible venting surface or a test hole in the ground, including, an elongated tube, a conically shaped bellows having an upper end attached to one end of said elongated tube and an open lower end for sealing a possible venting surface or a test hole from the atmosphere when the probe is moved into position over a possible venting surface or a test hole, a flexible tube having one end connected to the other end of said elongated tube and the other end thereof provided with a fitting for connecting the flexible tube to a gas analyzing and indicating apparatus, a filter means disposed in said elongated tube for filtering an air sample drawn through the elongated tube from a possible venting surface or a test hole, and a handle slidably mounted on said elongated tube. Alternatively, the flexible tube may be extended through said elongated tube and have said one end connected directly to said bellows.

Other objects, features and advantages of this invention will be apparent from the following detailed description, appended claims, and the accompanying drawings.

A DESCRIPTION OF THE PREFERRED EMBODIMENTS

Figures 1, 2, 3, 4, 5:
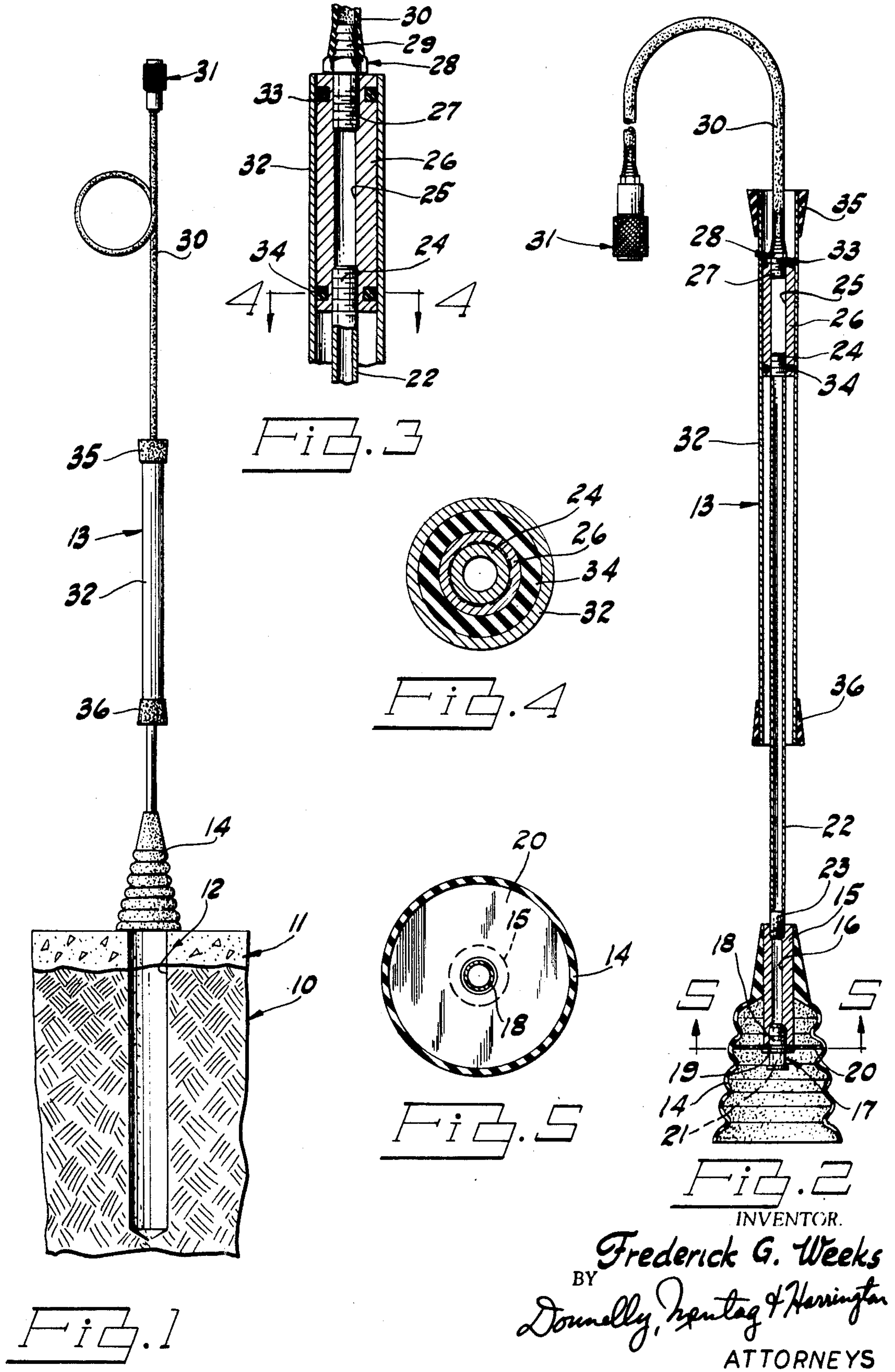
FIG. 1 is a side elevational view of a first illustrative telescoping sample probe made in accordance with the principles of the present invention.
FIG. 2 is a broken elevational view, partly in section, of the telescoping sample probe illustrated in FIG. 1.
FIG. 3 is an enlarged, fragmentary section view of the upper end portion of the telescoping sample probe shown in FIG. 2.
FIG. 4 is an enlarged, horizontal sectional view of the telescoping sample probe illustrated in FIG. 3, taken along the line 4—4 thereof, and looking in the direction of the arrows.
FIG. 5 is an enlarged, horizontal sectional view of the telescoping sample probe shown in FIG. 2, taken along the line 5—5 thereof, and looking in the direction of the arrows.

Referring now to the drawings, and in particular to the first illustrative embodiment of FIG. 1, the numeral 10 generally indicates the ground and the numeral 11 indicates a concrete roadway, or the like. The numeral 12 generally indicates a test hole which has been bored through the concrete 11 and into the ground 10 in a position adjacent an underground gas transmission line. The test hole 12 is usually made from one inch to three inches in diameter and to any desired length. A number of test holes 12 are formed in a line above a gas transmission line at spaced apart positions and they are drilled or formed in any suitable manner.

The first illustrative telescoping sample probe is generally indicated in FIGS. 1 and 2 by the numeral 13 and it comprises a conically shaped rubber bellows 14 which is open at the lower end thereof. The bellows 14 is made from any suitable material, as for example, rubber. The upper end of the bellows 14 is provided with a reduced neck portion which has a hole formed therethrough and in which is seated the lower end, round bar connection fitting 15 that is preferably made from aluminum. The bar connection fitting 15 is held in the bellows 14 by a friction fit. The bar connection fitting 15 is provided with an axial bore or passage 16. An intake port or fitting 17 is provided with a threaded upper end 18 which is threadably mounted in the lower end of the bore 16 in the bar connection fitting 15. The fitting 17 is made from any suitable material, as for example, brass.

As shown in FIG. 2, the fitting 17 is provided with an integral, outwardly extended flange 19 which is adapted to hold a washer 20 in a transverse position against the lower end of the bar connection fitting 15. The outer periphery of the washer 20 is adapted to seat against the inner surface of the rubber bellows 14, as shown in FIGS. 2 and 5. The washer 20 may be made from any suitable material, as for example, aluminum. The fitting 17 is provided with an axial bore therethrough which communicates with the bore 16 in the bar connection fitting 15. A suitable filter 21 is disposed in the lower end of the axial bore in the fitting 17 for filtering a test air sample drawn into the bellows 14 and through the fitting 17, as explained more fully in detail hereinafter. The washer 20 functions as a centering means to retain the fitting 17 in a central position in the bellows 14 and to eliminate pocketing of a sample behind the intake port.

As illustrated in FIG. 2, the probe includes an elongated tube or pipe 22 which is provided with a lower threaded end 23 that is threadably mounted in the upper end of the bar connection fitting 15. The tube 22 is made from any suitable material, as for example, aluminum, and it is made to any desired length.

The upper end 24 of the tubing 22 is threadably mounted into the lower end of an axial bore or passage 25 formed in an upper bar connection fitting or piston 26. The piston 26 may be made from any suitable material, as for example, aluminum. The lower threaded end 27 of a hose fitting, generally indicated by the numeral 28, is threadably mounted into the upper end of the piston bore 25. As best seen in FIG. 3, the upper end 29 of the fitting 28 comprises a hose attachment end and it is adapted to have mounted thereon, as by a press fit, one end of a flexible vinyl tubing 30. As shown in FIGS. 1 and 2, the other end of the vinyl tubing 30 is operatively connected to a suitable quick disconnect coupling 31 for connecting the sample probe to a conventional apparatus for purging the test holes 12 and drawing an air sample from the holes for testing the sample for the presence of combustible gas. Any conventional combustible gas analyzer and indicating apparatus may be employed.

As shown in FIG. 2, a tubular handle 32 is slidably mounted on the piston 26. As best seen in FIG. 3, the piston 26 is provided with a pair of O-rings 33 and 34 which retain frictionally the handle 32 in an adjusted position relative to the piston 26. The handle 32 may be made from any suitable material, as for example, aluminum. The upper and lower ends of the handle 32 are each provided with suitable conically shaped tips 35 and 36, respectively. The tips 35 and 36 are frictionally mounted over the peripheral ends of the handle 32, and they may be made from suitable material, as for example, a plastic tubular material. The sliding piston 26 functions to hold the lower tubing 22 in position relative to the handle 32, and it also eliminates wobbling of the handle 32 on the tube 22.

The telescoping sample probe 13 of the present invention is lighter in weight than the prior art sample probes, and the telescoping handle 32 permits the overall length of the probe to be reduced by nearly one half of its fully extended length. The telescoping feature of the probe 13 permits it to be carried and stored easier than the prior art probes.

An advantageous feature of the first illustrative probe of the present invention is that the vinyl tubing is directly connected to the lower tube 22 which eliminates the use of a number of fittings which would be necessary if the tube 30 were connected to the upper end of the handle 32. The washer 20 functions not only to center the fitting 17 in the rubber bellows 14, but it also functions as a baffle in the rubber bellows 14 and decreases the purge time and eliminates pocketing of a sample behind the intake port.

In use, the first illustrative probe of the present invention is disposed with the lower open end of the bellows 14 over the test hole 12 with the quick disconnect fitting 31 connected to a conventional gas purging, analyzing and indicating apparatus. The bellows 14 functions as a sealing means to seal the hole 12 from the atmosphere. The air in the test hole 12 is purged in the usual manner until a reading cannot be obtained on the gas indicator, then the gas indicator is adjusted to draw a test sample of air directly from the test hole 12 to test for leakage of combustible gas into the test hole 12 from the ground 10. The handle 32 can be slid upwardly and downwardly on the piston 26 to a desired position to permit the user to grasp the probe at any desired height above the ground.

Figures 6, 7:
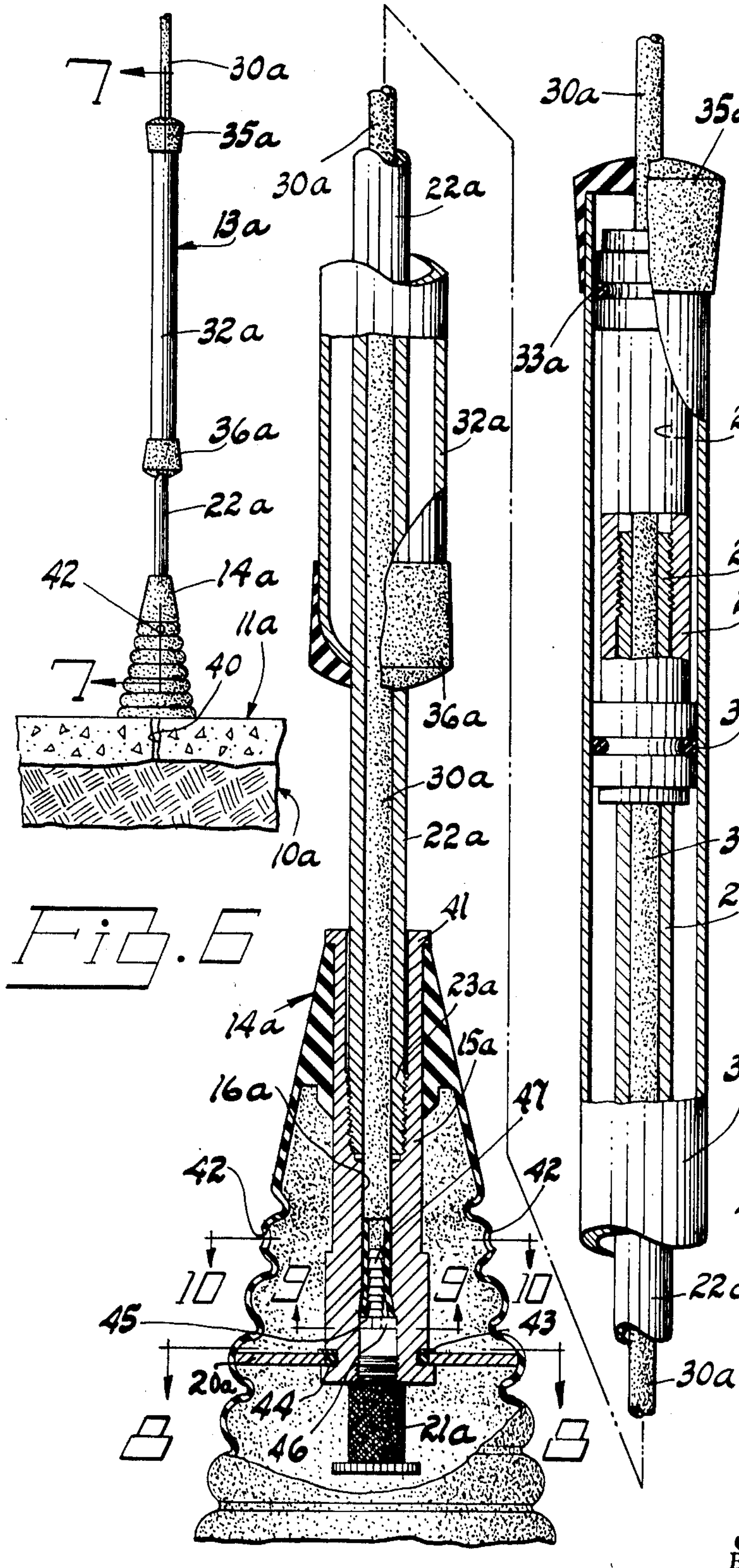
FIG. 6 is a side elevational view of a second illustrative, telescoping sample probe made in accordance with the principles of the present invention.
FIG. 7 is a broken, elevational view, partly in section, of the telescoping sample probe illustrated in FIG. 6, taken along the line 7—7 thereof, and looking in the direction of the arrows.

FIGS. 6 through 10 illustrate a second embodiment of the invention, and the parts of the second embodiment which correspond to the parts of the first embodiment of FIGS. 1 through 5 have been marked with the same reference numerals followed by the small letter "*a*." The second illustrative telescoping sample probe is especially adapted for use on a venting surface **11*a*, as illustrated in FIG. 6, as over a crack 40** in said surface. It will be understood that the sample probe illustrated in FIG. 6 through 10 may also be used directly on the soil surface in the vicinity of a gas transmission line leak.

The gas sample probe illustrated in FIGS. 6 through 10 differs from the first illustrated embodiment in that the flexible tubing **30*a* passes through the tubing or stem 22*a* and is attached directly to the lower end bar fitting 15*a*. By connecting the tubing 30*a* directly to the fitting 15*a***, the probe illustrated in FIGS. 6 through 10 reduces the delay time between the sample intake port and the gas analyzing instrument by reducing the gas sample volume, and this is an important feature of the second illustrative embodiment.

As illustrated in FIG. 7, the flexible tube **30*a* passes through the upper piston or fitting 26*a* and the tubing 22*a* and into the lower end of the fitting 15*a*. The bore 16*a* in the fitting 15*a* is tapered in the end thereof, as marked by the numeral 45, so as to form a larger passage in the lower end of the fitting 15*a*. The lower end of the plastic line or tubing 30*a* is secured in place in the tapered passage portion by a small ⅛" barb which is pushed into the lower end of the tube 30*a* with a slight force fit. The barb includes the cross head 46 and the barb portion 47 which extends into the tubing 30*a* and forces it into a sealing position against the tapered bore surface 45. After the barb has been inserted into position, the plastic tubing 30*a* is pulled upwardly, as viewed in FIG. 7, and this action anchors and seals the plastic tubing 30*a* into position on the fitting 15*a***.

Figure 8:
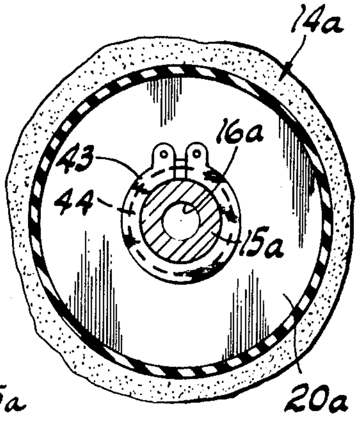
FIG. 8 is a horizontal, section view of the telescoping sample probe structure shown in FIG. 7, taken along the line 8—8 thereof, and looking in the direction of the arrows.
Figure 9:
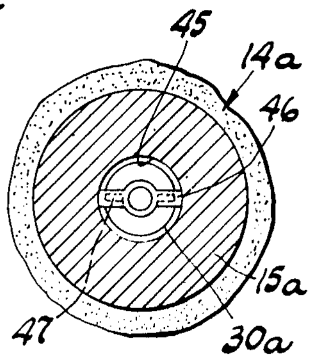
FIG. 9 is an enlarged horizontal, section view of the telescoping sample probe illustrated in FIG. 7, taken along the line 9—9 thereof, and looking in the direction of the arrows.
Figure 10:
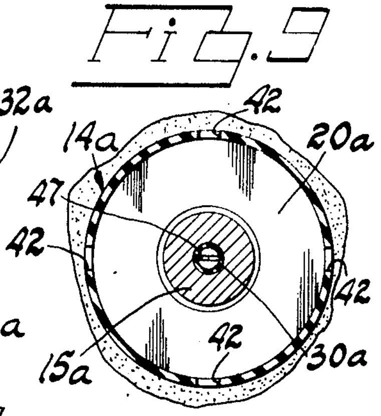
FIG. 10 is a horizontal, section view of the telescoping sample probe illustrated in FIG. 7, taken along the line 10—10 thereof, and looking in the direction of the arrows.

As illustrated in FIGS. 7 and 8, the aluminum washer 20*a* is seated on a shoulder on the lower end of the fitting 15*a*. An O-ring 44 is mounted between the inner diameter of the washer 20*a* and the fitting 15*a*. The washer 20*a* is held against axial movement on the fitting 15*a* by a steel snap ring 43. The last-mentioned structure provides a seal around the internal and external edges or sides of the washer 20*a* so as to prevent the air sample being taken, from becoming lodged behind the washer 20*a*. The rubber conical bellows 14*a* is provided with a plurality of vent holes 42 which allow the hollow upper end of the bellows 14*a* to be exhausted to the atmosphere in case of failure of the air seal around the internal and external diameters of the washer 20*a*. The upper end of the bellows 14*a* is seated against a flange 41 which is formed on the upper end of the fitting 15*a*.

The second illustrative embodiment of FIGS. 6 through 10 would function in the same manner as previously described under the description of the first embodiment of FIGS. 1 through 5.

An important function of the cone-shaped bellows 14*a* is that it protects the sample intake port from wind shear. The illustrative probe embodiments are primarily adapted for use with sensitive detectors where actual drilling through a venting surface is not required. The sample probes of the present invention are adapted to take advantage of the minute concentrations of gas in the air existing above the soil surface in the vicinity of a line leak. The protecting or shielding of the intake port from wind shear by the bellows cone 14*a* greatly reduces the dilution of the sample and results in an improved overall efficiency of a gas detector-sample probe combination or assembly.

While it will be apparent that the preferred embodiments of the invention herein disclosed are well calculated to fulfill the objects above stated, it will be appreciated that the invention is susceptible to modification, variation and change.

What is claimed is:

1. A gas sample probe for drawing a test sample of air from a venting surface on the ground comprising:
(a) an elongated tube;
(b) a tubular handle slidably and concentrically mounted on said elongated tube;
(c) a sealing means attached to one end of said elongated tube for sealing a portion of a venting surface from the atmosphere when the probe is seated on the venting surface;
(d) a sample intake means mounted in said sealing means; and
(e) a flexible tube having one end communicating with said sample intake means and the other end thereof provided with a fitting for connecting the flexible tube to a gas analyzing and indicating apparatus.

2. A gas sample probe as defined in claim 3, including: a filter means disposed in said sample intake means for filtering an air sample drawing from a venting surface.

3. A gas sample probe for drawing a test sample of air from a venting surface on the ground comprising:
(a) an elongated tube;
(b) a tubular handle slidably mounted on said elongated tube;
(c) a sealing means attached to one end of said elongated tube for sealing a portion of a venting surface from the atmosphere when the probe is seated on the venting surface;
(d) a sample intake means mounted in said sealing means;
(e) a flexible tube having one end communicating with said sample intake means and the other end thereof provided with a fitting for connecting the flexible tube to a gas analyzing and indicating apparatus; and
(f) said sealing means comprising a conically shaped bellows having an open lower end.

4. A gas sample probe as defined in claim 3, including: means for centering said one end of the elongated tube in said bellows.

5. A gas sample probe as defined in claim 4, wherein: said means for centering the elongated tube in said bellows comprises a fitting attached to said one end of said elongated tube, a circular member disposed between said fitting and said bellows, and means for detachably securing the circular member to said fitting.

6. A gas sample probe as defined in claim 5, wherein: said circular member is a wafer type member with an internal diameter sealed around said fitting and an external diameter sealed against the inner surface of said bellows so as to seal the lower end of the bellows from the upper end.

7. A gas sample probe as defined in claim 6, including: an O-ring seal disposed between the internal diameter of the circular member and the fitting.

8. A gas sample probe as defined in claim 5, wherein: said bellows is provided with vent means to vent the upper end thereof to the atmosphere.

9. A gas sample probe as defined in claim 5, wherein: said elongated tube is a rigid tube.

10. A gas sample probe as defined in claim 9, including:
(a) a piston member attached to the other end of said elongated tube; and
(b) said tubular handle being slidably and adjustably mounted on said piston member.

11. A gas sample probe as defined in claim 10, including: means on said piston member for engaging said handle for retaining the handle in an adjusted position on the piston member.

12. A gas sample probe as defined in claim 11, wherein: said retaining means comprises a friction means.

13. A gas sample probe as defined in claim 9, wherein: said one end of said flexible tube is extended through said elongated rigid tube and is connected directly to said sample intake means.

14. A gas sample probe as defined in claim 9, wherein: said one end of said elongated rigid tube is connected directly to said sample intake means and the other end of said elongated tube is connected to said one end of the flexible tube.

References Cited

UNITED STATES PATENTS

| | | | |
|---|---|---|---|
| 2,386,832 | 10/1945 | Zaikowsky et al. | 73—421.5 |
| 3,067,619 | 12/1962 | Fielding | 73—421.5 |

FOREIGN PATENTS

| | | | |
|---|---|---|---|
| 76,994 | 1/1954 | Denmark | 73—421.5 |
| 1,127,699 | 9/1968 | Great Britain | 73—421.5 |

S. CLEMENT SWISHER, Primary Examiner